(12) United States Patent
Stigger

(10) Patent No.: US 7,464,952 B2
(45) Date of Patent: Dec. 16, 2008

(54) MEDIA WINDSHIELD FOR TWO-WHEELED VEHICLE

(76) Inventor: Hal Stigger, 3111 Stemmons Freeway, Dallas, TX (US) 75247

( * ) Notice: Subject to any disclaimer, the term of this patent is extended or adjusted under 35 U.S.C. 154(b) by 404 days.

(21) Appl. No.: 11/074,257

(22) Filed: Mar. 7, 2005

(65) Prior Publication Data

US 2006/0197354 A1    Sep. 7, 2006

(51) Int. Cl.
*B62J 39/00* (2006.01)
(52) U.S. Cl. .................. 280/288.4; 296/84.1
(58) Field of Classification Search ............ 296/78.1, 296/190.1, 84.1, 97.7; 280/288.4; 455/152.1
See application file for complete search history.

(56) References Cited

U.S. PATENT DOCUMENTS

| | | | | |
|---|---|---|---|---|
| 2,792,899 A * | 5/1957 | Piatti | ............ | 180/229 |
| 4,473,251 A * | 9/1984 | Murayama | .................. | 296/78.1 |
| 5,222,752 A * | 6/1993 | Hewitt | ...................... | 280/288.4 |
| D345,534 S * | 3/1994 | Abboud et al. | ............. | D12/114 |
| 6,532,152 B1 * | 3/2003 | White et al. | ................ | 361/692 |
| D514,033 S * | 1/2006 | Jacklyn, II | .................. | D12/114 |
| 2002/0131606 A1 * | 9/2002 | Stanberry et al. | ............. | 381/86 |
| 2003/0036360 A1 * | 2/2003 | Russell et al. | .................. | 455/66 |
| 2004/0102166 A1 * | 5/2004 | Morita et al. | ............. | 455/152.1 |
| 2005/0121935 A1 * | 6/2005 | Bell | .......................... | 296/78.1 |

* cited by examiner

*Primary Examiner*—Lesley D Morris
*Assistant Examiner*—Maurice Williams
(74) *Attorney, Agent, or Firm*—Duke W. Yee; Mari A. Stewart

(57) ABSTRACT

A windshield for bicycles and scooters. The windshield includes a media player, such as a compact disc player, that may be operated while riding a bicycle or scooter.

20 Claims, 2 Drawing Sheets

Stigger
HSTIG.001
Media Windshield for Two-Wheeled Vehicles

Stigger
HSTIG.001
Media Windshield for Two-Wheeled Vehicles

Stigger
HSTIG.001
Media Windshield for Two-Wheeled Vehicles

MEDIA WINDSHIELD FOR TWO-WHEELED VEHICLE

BACKGROUND OF THE INVENTION

1. Technical Field

The present inventions relate to windshields for two-wheeled vehicles.

2. Description of Related Art

Windshields have been used on two-wheeled vehicles to lessen the amount of air blowing in a rider's face as well as to protect the rider from fast-moving objects, such as debris thrown by vehicles in front of the rider. However, such windshields have lacked attractive structures that increase a rider's desire to purchase windshields on two-wheeled vehicles that are not required to have them, such as scooters and bicycles. Similarly, attractive structures are needed to increase the market appeal of riding two-wheeled vehicles.

SUMMARY OF THE INVENTION

The present invention provides for a media shield having a media player and speakers attached to a windshield. The media shield is adapted to be attached to the handlebars of a two-wheeled vehicle. Thus, the inventions allow a rider to listen to music easily while riding without having to carry a media player. The inventions described below may be marketed under the name "Jam Shield" or "The Jam Shield."

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
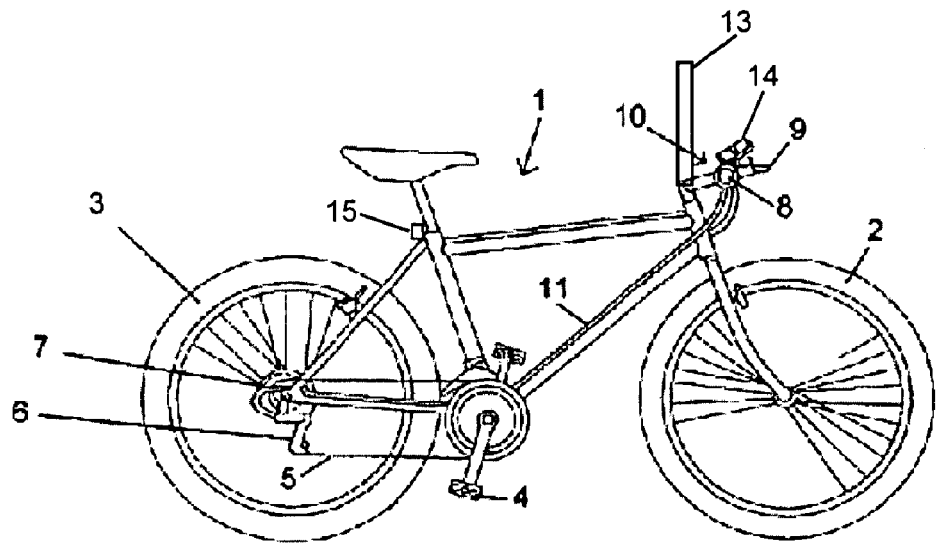
FIG. 1 shows a bicycle having a media windshield.

FIG. 1 shows a bicycle 1 having a media windshield. The bicycle may be any two-wheeled vehicle, including a motorcycle, scooter, moped, or other two-wheeled vehicle.

The bicycle is provided with wheels 2 and 3, which are driven by a rider pressing on pedals 4. The pedals drive a chain 5 through a gearshift 6 and 7 and the chain drives rear wheel 3. The bicycle is steered via handlebars 8, which are connected to frame 11 via central support bar 10. A windshield 13 may be attached to the handles of the bicycle. A media player and speakers are attached to the windshield, as described further with respect to FIG. 2, to form a media shield. In addition, one or more headlights 14 and one or more safety lights 15 may be provided with the bicycle. In these illustrative examples, headlights 14 and safety lights 15 are added as an optional feature or by special order and are not normally included on a regular jam shield.

Figure 2:
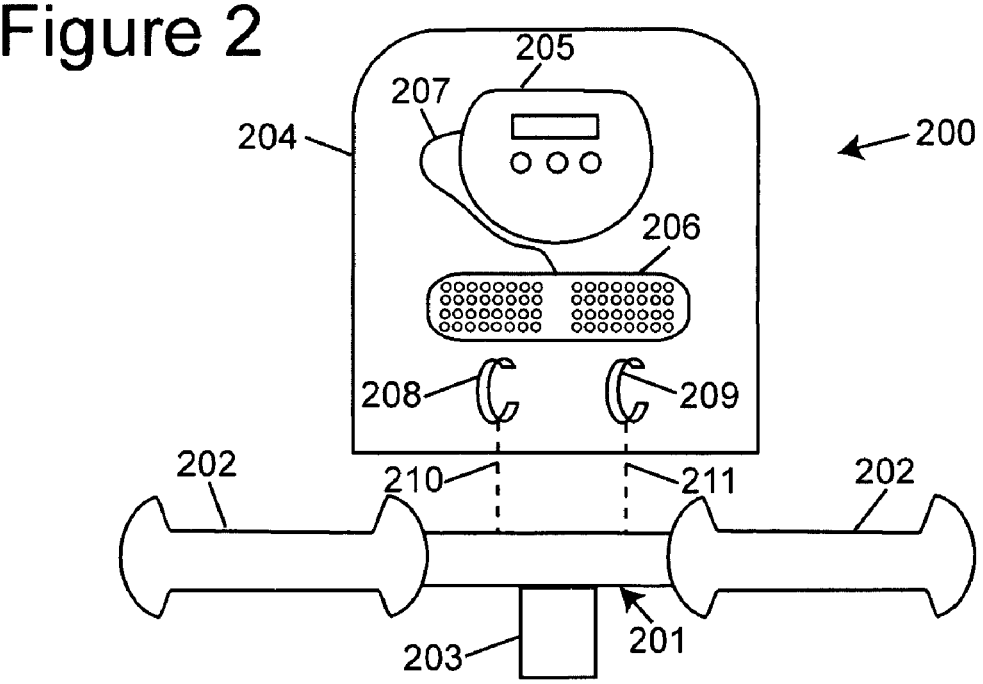
FIG. 2 shows a media windshield attached to the handlebars of a two-wheeled vehicle.

FIG. 2 shows a media windshield 200 attached to the handlebars 201 of a two-wheeled vehicle. (The windshield may be attached to either grip 202 of the handlebars, or may be attached to the central support piece 203 of the handlebars.) The media windshield includes a windshield 204 and a media player 205 attached to or embedded within the windshield. Optionally, speakers 206 may also be attached to or disposed within the windshield. If so, then one or more wires 207 electrically connect the media player to the speakers, though the speakers and media player may be connected using a variety of wireless technologies. Optionally, clips 208 and 209 may be used to connect the media windshield to handle bars 201, as shown by dashed lines 210 and 211, respectively. However, any suitable means may be used to attach the media windshield to the handlebars.

The windshield is preferably made of clear poly methyl meth acrylate or Lucite (commonly marketed under the name Plexiglas®.), though the windshield may also be made of glass, clear polycarbonate materials (commonly marketed under the name Lexan®), or other plastic, durable materials suitable for use as a windshield on a two-wheeled vehicle. The windshield may also be provided with a variety of attractive drawings or embedded markings. If the windshield is sized and dimensioned such that the rider can easily see over the windshield, then the windshield may also be decoratively painted or made of an opaque material. The windshield may have a variety of shapes and sizes.

The media player may be any kind of media player capable of playback of a media, including but not limited to a compact disc player, a DVD player, an MP3 player or a tape player. Preferably, the media player is a compact disc player or other music player so that the rider is not tempted to watch a video while riding the two-wheeled vehicle. If the media player is embedded within the windshield, then the rider should be given some means to control the compact disc player controls and some means to replace batteries. Such means include but are not limited to placing holes in the windshield or making portions of the windshield flexible enough to push the buttons through the windshield.

The speakers may be any kind of speakers suitable for producing sound associated with data read by the media player. Preferably, the speakers provide surround sound to increase the listening experience of the rider. If the speakers are embedded in the windshield, then at least one opening should be provided in the windshield to allow sound from the speakers to travel unimpeded.

The media shield may be attached to the handlebars with clamps, screws or any other suitable means for attaching the media shield to the handlebars. Preferably, the media windshield is sold as a separate unit so that riders may purchase the media windshield for use with pre-existing two-wheeled vehicles. However, the media windshield also may be integrally formed with the handlebars.

Figure 3:
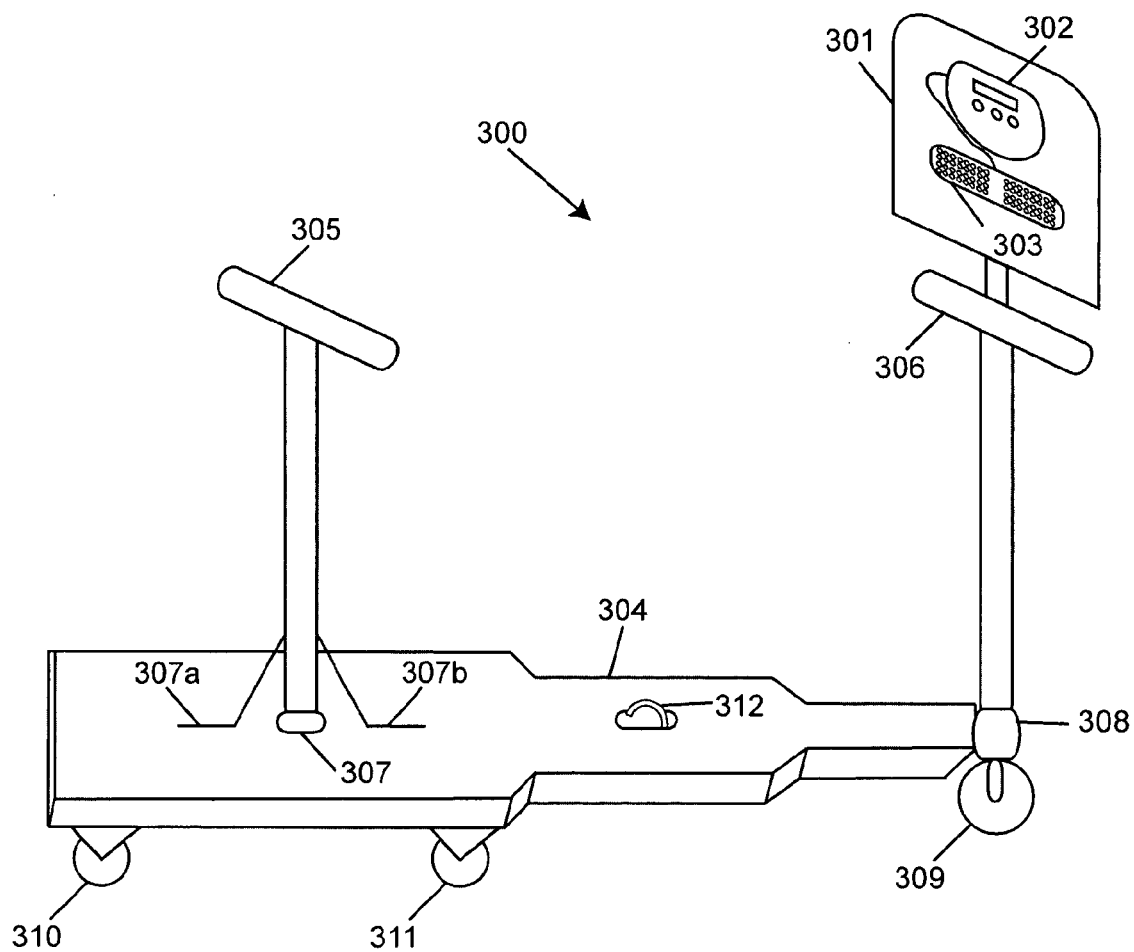
FIG. 3 shows a two-person scooter to which a media windshield has been attached.

FIG. 3 shows a two-person scooter 300 to which a media windshield 301 has been attached. Media windshield 300 corresponds to media windshield 200 of FIG. 2 and include similar features, such as media player 302, and speakers 303.

Generally, the two-person scooter includes a floorboard 304 to which is attached a set of passenger handlebars 305 and a set of driver handlebars 306. Although the terms "passenger" and "driver" are used, the term "passenger" broadly includes anyone standing on or partially on floorboard 304 and next to handlebars 305 and the term "driver" broadly includes anyone standing on or partially on floorboard 306 and next to handlebars 306. Passenger handlebars 305 are connected to floorboard 304 via any suitable means 307 for connecting handlebars 305 to floorboard 304. For example, the means 307 for connecting handlebars 305 to floorboard 304 may be handle bar locks 307a and 307b. Driver handlebars 306 are connected to floorboard 304 via any suitable means 308 for connecting handlebars 306 to floorboard 304.

However, driver handlebars 306 are also operable to turn front wheel 309 in order to steer the two-person scooter. In conjunction with front wheel 309, one or more back wheels, such as back wheel 310, and optionally one or more center wheels 311, allow two-person scooter 300 to roll along a surface. In alternative embodiments, passenger handlebars 305 may be omitted from the two-person scooter or may be removably attached to the two-person scooter.

Although FIG. 3 shows media windshield 301 connected to driver handlebars 306, media windshield 301 may be connected to passenger handlebars 305. Similarly, a media windshield may be attached to each of driver handlebars 306 and passenger handlebars 306. In addition, media windshield 301 may be connected to either set of handlebars via any suitable means for allowing the media windshield to be rotated with respect to either a vertical or a horizontal axis relative to floorboard 304. In addition, media windshield 301 may be attached to either set of handlebars via a flexible connection such that the angle media windshield 301 makes with a set of handlebars may be easily adjusted. Media windshield may also be attached to either set of handlebars via a telescoping mechanism that allows the media windshield to be adjusted vertically or horizontally relative to floorboard 304. Most generally, media windshield 304 may be operably attached to any suitable portion of two-person scooter 300, including hook 312.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A windshield adapted for use on a two-wheeled vehicle having handlebars, said windshield comprising:
   a clear sheet of material, said material suitable for use as a windshield on the two-wheeled vehicle; and
   a media player embedded in the clear sheet of material, said media player operable to playback media; and
   means for attaching the clear sheet of material to the handlebars of the two-wheeled vehicle.

2. The windshield of claim 1 wherein the media player comprises a compact disc player.

3. The windshield of claim 1 further comprising speakers operable with the media player to produce sound associated with data recorded on the media player.

4. The windshield of claim 1 wherein the clear sheet of material comprises a material selected from the group consisting of glass and plastic.

5. The windshield of claim 1 wherein the clear sheet of material is provided with at least one hole disposed near the media player.

6. A system for providing transportation, said system comprising:
   a two-wheeled vehicle having handlebars; and
   a windshield operably attached to the handlebars of the two-wheeled vehicle, said windshield comprising:
   a clear sheet of material, said material suitable for use as a windshield on the two-wheeled vehicle;
   a media player embedded in the clear sheet of material, said media player operable to playback media; and
   means for attaching the clear sheet of material to the handlebars of the two-wheeled vehicle.

7. The system of claim 6 wherein the vehicle is a scooter.

8. The system of claim 6 wherein the vehicle is a bicycle.

9. The system of claim 6 wherein the media player comprises a compact disc player.

10. The system of claim 6 further comprising speakers operable with the media player to produce sound associated with data recorded on the media player.

11. The system of claim 6 wherein the clear sheet of material comprises a material selected from the group consisting of glass and plastic.

12. The system of claim 6 wherein the clear sheet of material is provided with at least one hole disposed near the media player.

13. A system for providing transportation, said system comprising:
    a two-person scooter having a set of handlebars; and
    a windshield operably attached to the set of handlebars, said windshield comprising:
    a clear sheet of material, said material suitable for use as a windshield on the two-person scooter;
    a media player embedded in the clear sheet of material, said media player operable to playback media; and
    means for attaching the clear sheet of material to the handlebars of the two-person scooter.

14. The system of claim 13 wherein the media player comprises a compact disc player.

15. The system of claim 13 further comprising speakers operable with the media player to produce sound associated with data recorded on the media player.

16. The system of claim 13 wherein the clear sheet of material comprises a material selected from the group consisting of glass and plastic.

17. The windshield of claim 1 wherein a portion of the clear sheet of material is flexible enough to allow users to push controls of the media player through the windshield.

18. The system of claim 6 wherein a portion of the clear sheet of material is flexible enough to allow users to push controls of the media player through the windshield.

19. The system of claim 13 wherein the clear sheet of material is provided with at least one hole disposed near the media player.

20. The system of claim 13 wherein a portion of the clear sheet of material is flexible enough to allow users to push controls of the media player through the windshield.

* * * * *